Jan. 17, 1967  YOZO FURUKAWA ETAL  3,299,272
PHOTOSENSITIVE SYSTEM FOR TAKING OUT DESIRED
PORTIONS OF RECORDS ON MICROFILM
Filed Feb. 6, 1964  2 Sheets-Sheet 1

3,299,272
PHOTOSENSITIVE SYSTEM FOR TAKING OUT DESIRED PORTIONS OF RECORDS ON MICROFILM

Yozo Furukawa, Tokyo, Toyokazu Satomi, Kawasaki-shi, and Hajime Hariu and Shuji Takei, Tokyo, Japan, assignors to Kabushiki Kaisha Ricoh, Tokyo, Japan, a corporation of Japan
Filed Feb. 6, 1964, Ser. No. 343,020
Claims priority, application Japan, Feb. 9, 1963, 38/6,676
4 Claims. (Cl. 250—219)

This invention relates to the art of microfilm recording or the like, and more particularly to a system for taking out any desired portions of records from a microfilm or the like having such records thereon.

It is well-known that a great number of records, such as documents, drawings, sketches, etc., can be photographed in succession on a long length of microfilm or the like for the purpose of preservation. When desired, any frame on the thusly constituted film may be selected and reproduced in an enlarged scale by projection on a screen or by photographic enlargement. The edge portion of the microfilm is provided for selection purposes with series of identification marks having a light transparency different from that of the surrounding film as will be drawn hereinafter. In the selection operation, the film is fed through a detecting device in which the film is passed between a light source and a photoelectric transducing element, such as phototransistor, disposed in opposition along the edge portion of the film having the identification marks. When the edge portion of the film passes between the light source and the phototransistor in forward or reverse direction, pulse signals are produced by the phototransistor, and passed to a counting circuit through gate circuits for selecting the desired frame.

In such a known system, a light source and a single photoelectric transducer being in opposition, and instructions for forward or reverse feeding as well as instructions for addition or subtraction being simultaneously issued, if the $n$th frame has passed through the detecting means, and the film feeding is reversed before the next frame mark reaches the detecting means, a change in addition and subtraction instructions is effected at the instant of feeding reversal, and the $n$th frame would naturally become $(n-1)$th frame in the counting. Contrary to the above, when the change is effected from reverse feeding to forward feeding, the $n$th frame would become $(n+1)$th frame in the counting. Thus, errors can result.

The primary object of the present invention is to provide a system of the aforementioned kind for selecting desired frames of a record without fear of above-mentioned errors, accurately and promptly.

There are other objects and particularities of the present invention, which will become obvious from the following detailed description, with reference to the accompanying drawings, in which:

FIG. 1 shows the manner of pulse signals being generated by use of a single photoelectric transducing element in a conventional system for selecting a desired frame from a microfilm or the like;

Figure 1:
Figure 2:
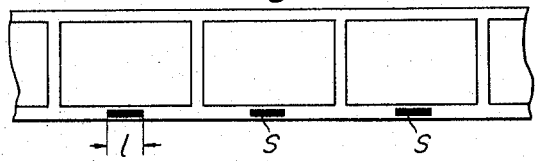
FIG. 2 is a partial plan view of a microfilm having identification marks of special light transparency in the edge portion thereof adjacent each frame.

Referring to FIG. 2 of the drawing, each of the frame-identification marks S has a definite length $l$, and a light transparency different from that of the portions of the surrounding side edge of the film having no marks S therein. A pair of photoelectric transducing elements $a$ and $b$ are disposed side-by-side in the direction of travel of the microfilm, and a light source L is disposed in substantial opposition to the elements $a$ and $b$. The distance between elements $a$ and $b$ should be smaller than the projection onto the elements $a$ and $b$ of the length $l$ of identification mark S.

Figure 3:
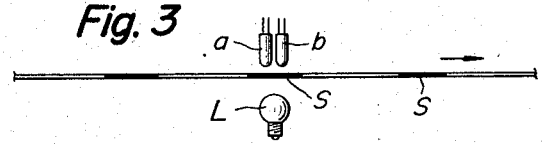
FIG. 3 is a side view of a microfilm as shown in FIG. 2, together with a light source and a pair of photoelectric transducing elements disposed in opposition, with the marked edge portion of the microfilm passing therebetween according to the present invention.

It is now assumed that the microfilm is fed in the forward direction as shown by the arrow in FIG. 3, and the $n$th frame of record has been detected, and it is desired that the $m$th frame should next be identified. When $m-n>0$, the film is to be fed further in the forward direction for effecting addition counting, but when $m-n<0$, the film feeding should be reversed for effecting subtraction counting.

When the film travels in the forward direction as shown by the arrow in FIG. 3, light enters first into the photoelectric transducer $a$ and then into the transducer $b$, and this order is reversed when the film travels in the reverse direction. Thus, time shifts occur between signal inputs that enter into the pair of photoelectric elements $a$ and $b$, and such time shifts are different in accordance with the directions of travel of the microfilm. According to the present invention, such time-shift differences between input signals A and B (FIG. 4) are employed for addition-subtraction instructions for the counting-circuit inputs and for counting.

For producing the pulse signals, transparent marks S may be made in an opaque edge portion of the microfilm, but in the embodiment shown, opaque marks S are provided in a transparent edge portion of the microfilm. In other words, each period of time during which no light enters into a photoelectric element by virtue of an opaque mark S is called "signal period" during which no current flows through the photoelectric element, while the period of time during which current flows through the same element excited by light having passed through a transparent area of the film edge is called a "non-signal period."

Figure 4:
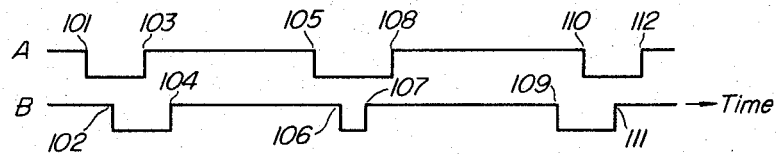
FIG. 4 shows pulse signals that are produced by a pair of photoelectric transducing elements as shown in FIG. 3, according to the present invention.

Referring to FIG. 4, A and B show charts of pulse signals produced by photoelectric transducing elements $a$ and $b$, respectively, with time as the abscissa. In these charts, low-level horizontal lines show "signal periods," while high-level horizontal lines represent "non-signal periods."

The relation between these pulse signals and the times when addition or subtraction instructions are issued to the counting circuit is as follows:

(1) When the microfilm is travelling in the forward direction, in the wave A, a signal period begins at time instant 101 and ends at time instant 103 when current flows through element $a$, and at the time 104 which lags by the time length corresponding to the distance between two elements $a$ and $b$, a signal period 102–104 of wave B ends and current begins to flow through element $b$, at which time instant the counting circuit is caused to assume its addition state.

(2) When the microfilm is travelling in the reverse direction, at time instant 107 when a signal of element $b$ ends, the wave B rises, and at the time 108 lagging by a period of time corresponding to the distance between elements $a$ and $b$, the wave A rises, and the counting circuit is caused to assume its subtraction state.

(3) When the microfilm is travelling in the forward direction, the wave A drops at time instant 105, and the pulse is counted only in the addition state, while during reverse travelling of the film, when the element $a$ does not produce pulse, the wave B drops at time instant 109, and subtraction only is counted.

Figure 5:
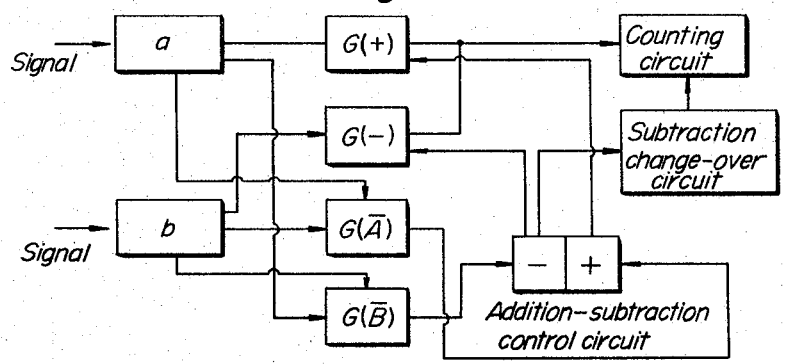
FIG. 5 is a block diagram showing an embodiment of the present invention, in which two kinds of pulse signals having the time shift as shown in FIG. 4 are employed.

With the above-explained situations in mind, the system shown in FIG. 5 will be explained. The photoelectric transducing element $a$ is connected to an addition counting gate circuit $G(+)$, an addition gate circuit $G(\overline{A})$, and a subtraction gate circuit $G(\overline{B})$, respectively, while the photoelectric element $b$ is connected to a subtraction counting gate circuit $G(-)$, an addition gate circuit $G(\overline{A})$, and a subtraction gate circuit $G(\overline{B})$, respectively.

From the subtraction gate circuit $G(\overline{B})$ and the addition gate circuit $G(\overline{A})$, connections are made through addition-subtraction control circuit to the addition counting gate circuit $G(+)$ and subtraction counting circuit $G(-)$, and these circuits $G(+)$ and $G(-)$ are connected to a counting circuit.

On the other hand, the subtraction side of addition-subtraction circuit is connected to the counting circuit through a subtraction change-over circuit. The subtraction change-over circuit is operated by a subtraction instruction signal from the addition-subtraction control circuit, whereby the counting circuit is caused to enter into the subtraction counting state.

During addition operation, when a signal of chart A enters at time instant 101 (FIG. 4) and the wave drops, one counting signal goes out. By virtue of a signal existing in chart A, gate $G(\overline{A})$ is closed, which otherwise would conduct the signal at time 102 of chart B. Next, at time 103, the wave of chart A rises, but by virtue of the signal existing in chart B, the gate $G(\overline{B})$ is closed, and the pulse of chart A at time 103 cannot pass through the gate $G(\overline{B})$. At time instant 104, the wave B rises, and the gate $G(\overline{A})$ is open by virtue of non-signal period of chart A, so that the pulse at time 104 can pass through the gate $G(\overline{A})$. At time 104, a signal is thus supplied to enter the counting circuit into addition state, as hereinbefore described. Consequently, when the wave of chart A drops thereafter, 1 is added through the addition counting gate $G(+)$.

When the $n$th frame of microfilm has passed through the detecting device and the direction of travel is reversed before the $(n+1)$th frame mark passes through the detecting device, the signal waves generated by the photoelectric elements $a$ and $b$ take the form 105–106–107–108. At time instant 105, 1 is added in the counting circuit as hereinbefore described, and the memory of the counting circuit becomes $(n+1)$. At time 106, no significant signal is generated by the above-described reason. At time 107, a signal exists in chart A so that the gate $G(\overline{A})$ is closed, which gate otherwise would conduct the signal due to the rise of wave B. Consequently, the rise of wave B at time instant 107 does not result in significant signal. At time instant 108, there is no signal in chart B, and the gate $G(\overline{B})$ is open to conduct the pulse due to the rise of wave A, and a subtraction signal issues. By virtue of this signal, the gate $G(+)$ is rendered non-conductive, while the gate $G(-)$ is rendered conductive. The subtraction change-over circuit is thus operated, and a subtraction operation is prepared. Next, at time instant 109, when the wave front of signal corresponding to the frame $n$ of the record comes, 1 is subtracted in the counting circuit whose memory thus becomes $n$. The frame number of the record film and the memory of counting circuit thus always coincide with each other. Thereafter, the subtraction counting is continued as long as the film travels in the reverse direction.

Figure 6:
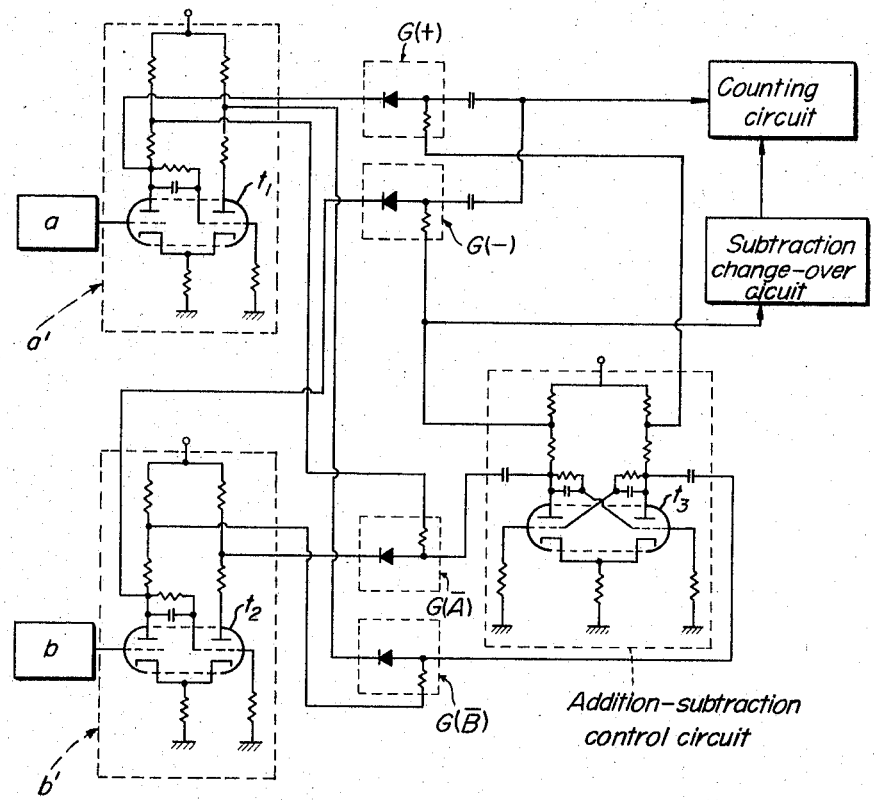
FIG. 6 shows diagrammatically an example of gate circuits and an addition-subtraction control circuit as employed in the system shown in FIG. 5.

In FIG. 6, it is seen in greater detail that transducing elements $a$ and $b$ are respectively connected to circuits $a'$ and $b'$ which respectively include tubes $t1$ and $t2$ which are double triodes conventionally included in circuits which function simply as shapers to shape the pulses received from transducing elements $a$ and $b$. It is also seen in this figure that the addition-subtraction control circuit includes a double triode $t3$ connected up as a bistable multivibrator coupled to gates $G(+)$ and $G(-)$ as well as to the subtraction change-over circuit to feed the latter a signal which enables switching from addition to subtraction and vice versa.

It should be noted that the present invention can also be carried out with a microfilm which does not have identification marks S beside each frame of record. In this case, spaces between successive frames of records are utilized for counting. Needless to say, when interframe spaces are utilized for producing counting signals, each frame of record should not contain portions with a transparency and longitudinal length which is the same as those of the interframe spaces as this would result in wrong counting. However, in practice, such is not the case and conventional microfilms having no identification marks may also be treated by the present system for selecting desired frames of records.

It should also be noted that a reflecting optical system may be disposed between the microfilm and the photoelectric transducing elements for reflecting the images of identification marks or interframe spaces, which images are projected on the photoelectric transducing elements, whereby any desirable magnification power, space between the photoelectric transducing elements, brightness of incident light transmitted to the photoelectric transducing elements, etc., may be adopted, and design and manufacture of the present system can be facilitated.

In the aforegoing, the circuits for adding or subtracting are well known. Some of these are described, for example, in High-Speed Computing Devices by the Staff of Engineering Research Associates, Inc., published by McGraw-Hill Book Co., Inc. in 1950. In this publication, attention is directed to Chapter 13 on Arithmetic Elements and, by way of example, to FIGS. 13–14 and 13–15 and the accompanying description in Sec. 13–4–3 in which will be seen the necessary circuitry for selectively adding and subtracting under the control of an associated control circuit.

What we claim is:

1. A system for selecting desired portions of records on a microfilm having thereon such records as well as areas that identify respective portions of records, comprising a light source, and a pair of photoelectric transducing elements disposed for receiving light from said light source, said microfilm being adapted to travel either in forward direction or in reverse direction with said identifying areas passing between said light source and said pair of photoelectric transducing elements which are disposed side-by-side in the direction of travel of said microfilm, each of the projections of said identifying areas onto said photoelectric transducing elements having a length longer than the distance between said photoelectric transducing elements, gate circuits for receiving electric signals produced by said pair of photoelectric transducing elements as said microfilm travels, a counting circuit and an addition-subtraction control circuit for receiving signals from said gate circuits, said gate circuits beng selectively opened and closed in accordance with time shift between light signals entering into said pair of photoelectric transducing elements through said identifying areas, one of said photoelectric transducing elements serving for indicating the direction of travel of said microfilm to switch over said addition-subtraction control circuit, while the other of said photoelectric transducing elements serves for counting.

2. The system according to claim 1, in which said identifying areas are marks which are provided in one side edge of said microfilm and which have light transparency different from those of the adjacent film.

3. The system according to claim 1, in which said identifying areas are spaces on said microfilm between successive portions of records thereon.

4. The system according to claim 1, comprising a reflecting optical system between said photoelectric transducing elements and said microfilm for projecting images of said identifying areas onto said photoelectric transducing elements.

References Cited by the Examiner

UNITED STATES PATENTS

| | | | |
|---|---|---|---|
| 3,096,444 | 7/1963 | Seward | 250—231 |
| 3,098,152 | 7/1963 | Von Mathes | 235—92 |
| 3,103,651 | 9/1963 | Heinecke et al. | 340—203 |

RALPH G. NILSON, *Primary Examiner.*

WALTER STOLWEIN, *Examiner.*